United States Patent
Tanabe et al.

(10) Patent No.: US 9,788,267 B2
(45) Date of Patent: Oct. 10, 2017

(54) MOBILE ELECTRONIC DEVICE, CONTROL METHOD, AND RECORDING MEDIUM THEREOF

(71) Applicant: KYOCERA Corporation, Kyoto-shi, Kyoto (JP)

(72) Inventors: Shigeki Tanabe, Yokohama (JP); Hideki Morita, Yokohama (JP); Isao Masuike, Machida (JP)

(73) Assignee: KYOCERA CORPORATION, Kyoto (JP)

( * ) Notice: Subject to any disclaimer, the term of this patent is extended or adjusted under 35 U.S.C. 154(b) by 0 days.

(21) Appl. No.: 15/314,061

(22) PCT Filed: May 28, 2015

(86) PCT No.: PCT/JP2015/065462
§ 371 (c)(1),
(2) Date: Nov. 25, 2016

(87) PCT Pub. No.: WO2015/182720
PCT Pub. Date: Dec. 3, 2015

(65) Prior Publication Data
US 2017/0156107 A1 Jun. 1, 2017

(30) Foreign Application Priority Data
May 29, 2014 (JP) .................. 2014-111363

(51) Int. Cl.
*H04W 4/00* (2009.01)
*H04W 48/16* (2009.01)
*H04W 64/00* (2009.01)

(52) U.S. Cl.
CPC ......... *H04W 48/16* (2013.01); *H04W 64/006* (2013.01)

(58) Field of Classification Search
USPC ....................... 455/434, 567, 41.2
See application file for complete search history.

(56) References Cited

U.S. PATENT DOCUMENTS 8,700,101 B2 * 4/2014 Yamashita .......... H04M 1/0245
                                                      381/104
9,237,601 B2 * 1/2016 Forutanpour ......... H04W 88/02
(Continued)

FOREIGN PATENT DOCUMENTS

JP          2012-160154 A      8/2012
JP     WO 2014034808 A1 *    3/2014 ............ H04W 48/16
JP          2014064265 A   *  4/2014

OTHER PUBLICATIONS

International Search Report in PCT/JP2015/065462, mailed Aug. 11, 2015.

*Primary Examiner* — David Q Nguyen
(74) *Attorney, Agent, or Firm* — Hauptman Ham, LLP

(57) ABSTRACT

A mobile electronic device (e.g., mobile phone) includes an acceleration sensor, a communication module, and a controller. The controller detects a moving state of an own device based on an acceleration detected by the acceleration sensor. When detecting that the own device in the moving state is stopped, the controller causes the communication module to search for the base station after the lapse of a first period of time. When detecting that the own device in the moving state is stood still, the controller causes the communication module to search for the base station before the lapse of the first period of time.

5 Claims, 6 Drawing Sheets

(56) References Cited

U.S. PATENT DOCUMENTS 9,250,701 B2 * 2/2016 Kim ........................ G06F 3/01
2016/0119879 A1 * 4/2016 Okamoto .......... H04W 52/0254
370/311

* cited by examiner

| ACCELERATION PATTERN | STATE |
|---|---|
| Pattern P0 | Stop state |
| Pattern P1 | Still state |
| Pattern P2 | Moving state by walking |
| Pattern P3 | Moving state by running |
| Pattern P4 | Moving state by vehicle |
| Pattern P5 | Moving state by bicycle |

MOBILE ELECTRONIC DEVICE, CONTROL METHOD, AND RECORDING MEDIUM THEREOF

CROSS-REFERENCE TO RELATED APPLICATION

The present application is a National Phase entry of International Application No. PCT/JP2015/065462, filed May 28, 2015, which claims priority of Japanese Application No. 2014-111363, filed May 29, 2014.

FIELD

The present application relates to a mobile electronic device, a control method, and a recording medium thereof.

BACKGROUND

Some mobile electronic devices are terminal devices in which an application performs data communication without any user operation.

SUMMARY

A mobile electronic device according to one embodiment includes an acceleration sensor configured to detect an acceleration, a communication circuitry configured to communicate with a base station, and a controller configured to detect a moving state in which an own device is moving based on the acceleration. The controller is configured to cause, when detecting that the own device in the moving state is stopped, the communication circuitry to search for the base station after the lapse of a first period of time, and cause, when detecting that the own device in the moving state is still, the communication circuitry to search for the base station before the lapse of the first period of time.

A mobile electronic device according to one embodiment includes an acceleration sensor configured to detect a magnitude of an acceleration and a direction of the acceleration, a communication circuitry configured to communicate with a base station, and a controller configured to detect a situation where an own device is moving based on the magnitude and the direction of the acceleration. The controller is configured to cause, when detecting that movement is stopped during the movement of the situation, the communication circuitry to search for the base station after the lapse of a first period of time, and cause, when detecting that the own device is stood still from the movement of the situation, the communication circuitry to search for the base station before the lapse of the first period of time.

A control method according to one embodiment for a mobile electronic device including an acceleration sensor and a communication circuitry configured to communicate with a base station includes the steps of detecting a moving state of an own device based on an acceleration detected by the acceleration sensor, causing, when detecting that the own device in the moving state is stopped, the communication circuitry to search for the base station after the lapse of a first period of time, and causing, when detecting that the own device in the moving state is still, the communication circuitry to search for the base station before the lapse of the first period of time.

A non-transitory computer readable recording medium that stores a control data according to one embodiment for causing a mobile electronic device including an acceleration sensor and a communication circuitry configured to communicate with a base station, to execute the steps of detecting a moving state of an own device based on an acceleration detected by the acceleration sensor, causing, when detecting that the own device in the moving state is stopped, the communication circuitry to search for the base station after the lapse of a first period of time, and causing, when detecting that the own device in the moving state is stood still, the communication circuitry to search for the base station before the lapse of the first period of time.

DETAILED DESCRIPTION

The mobile electronic device has room for improvement with respect to data communication with no user operations. Exemplary embodiments for implementing a mobile electronic device, a control method, and a non transitory computer readable recording medium thereof according to the present application will be explained in detail below with reference to the accompanying drawings. A mobile phone is explained below as an example of the mobile electronic device.

Figure 1:
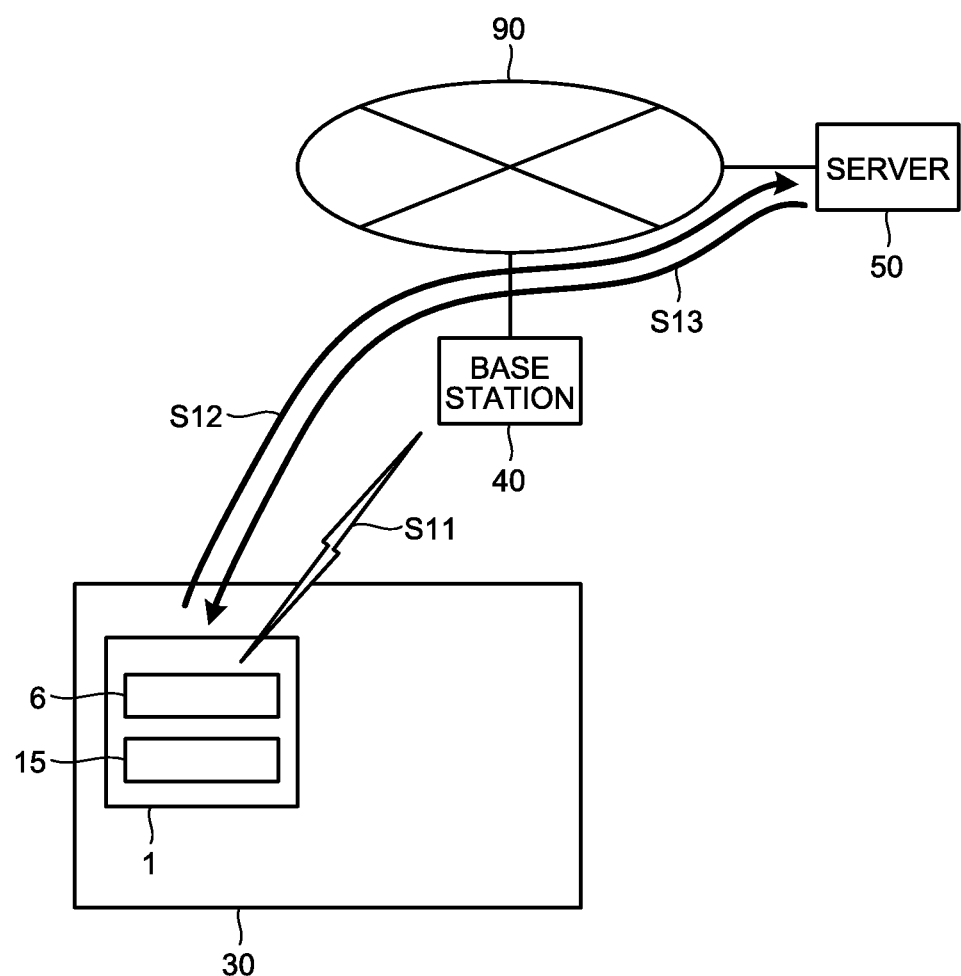
FIG. 1 is a diagram illustrating an example of data communication of a mobile phone.

FIG. 1 is a diagram illustrating an example of data communication of a mobile phone. A mobile phone 1 includes a communication module 6 and an acceleration sensor 15. The communication module 6 can communicate with other communication device via a base station 40. The base station 40 may be, for example, a short-range wireless access point located in the home or office, or the like. The base station 40 relays communication between the mobile phone 1 and a public line network 90. The mobile phone 1 has a function of performing data communication without any user operation via the base station 40. The acceleration sensor 15 can detect an acceleration acting on its own device.

A server 50 manages, for example, update data. The server 50 is capable of communicating with the mobile phone 1 via the public line network 90. The server 50 may communicate with the mobile phone 1 via the base station 40 in addition to the public line network 90. The server 50 stores the update data associated with at least one of identification information for identifying software to be updated and version information indicating the newness of the software after update. The version information may also serve as the identification information, and the identification information may also serve as the version information.

The server 50 can accept an inquiry about update from the mobile phone 1. When inquiring of the server 50 about update of certain software, the mobile phone 1 transmits the identification information for identifying the software to the server 50. The inquiry about update includes, for example, identification information for identifying software to be updated. When accepting the inquiry about the update, the server 50 acquires version information of the latest update data corresponding to the software identified by the identification information, and sends a response about the acquired version information to the mobile phone 1 of the inquiry source.

The server 50 can accept a transmission request of update data from the mobile phone 1. Upon requesting the server 50 to transmit update data of certain software, the mobile phone 1 transmits the identification information for identifying the software to the server 50. The transmission request of update data includes, for example, identification information for identifying software to be updated. When accepting the transmission request of update data, the server 50 acquires the latest update data corresponding to the software identified by the identification information, and transmits the acquired update data to the mobile phone 1 of the requestor.

The mobile phone 1 stores software information about the software installed in the mobile phone 1. The software information includes identification information and version information for each software installed in the mobile phone 1.

For example, when a user who is walking or running arrives at the destination such as the house or the office etc., he/she is more likely to put the carried mobile phone 1 on a desk or a table or so unless the mobile phone 1 is used. For example, when arriving at the destination such as the house or the office etc., the user is more likely to charge the mobile phone 1 with the carried mobile phone 1 being put on a desk or a table or so to charge it. It is highly possible that the base station 40 capable of performing short-range wireless communication with the mobile phone 1 is provided in the destination.

The mobile phone 1 can determine whether the own device remains still based on the acceleration detected by the acceleration sensor 15. By determining whether the own device remains still, the mobile phone 1 can assume whether the own device is put on, for example, a table 30. When it is determined that the own device remains still, the mobile phone 1 controls the communication module 6 to search for the base station 40. When finding the base station 40, then at Step S11 of FIG. 1, the mobile phone 1 establishes a communication connection with the base station 40. The method of determining whether the mobile phone 1 remains still will be explained later. The mobile phone 1 can communicate with the server 50 via the base station 40 and the public line network 90. The mobile phone 1 can perform data communication in the background without any user operation.

At Step S12 of FIG. 1, the mobile phone 1 inquires of the server 50 about the update of the mobile phone 1 through communication performed by the communication module 6. When accepting the inquiry about the update, the mobile phone 1 checks whether the installed software is to be updated. When accepting the inquiry from the mobile phone 1, then at Step S13, the server 50 transmits a response to the mobile phone 1. The server 50 transmits, for example, information for identifying software requiring update as the response to the mobile phone 1. When it is determined that the installed software requires update based on the response from the server 50 at Step S13, the mobile phone 1 displays information indicating that the update of the software is needed or notifies the user of the information.

When it is stood still after the movement of the user, the mobile phone 1 can cause the communication module 6 to search for the base station 40. When the base station 40 is found, the mobile phone 1 can establish a connection with the found base station 40. When the connection with the base station 40 is established, the mobile phone 1 can perform communication via the base station 40. The mobile phone 1 can automatically start communication in the background immediately after the establishment of the connection with the base station 40. The mobile phone 1 can perform background communication when the user does not carry the mobile phone 1. The mobile phone 1 can improve data communication with no user operation.

When it is determined that the mobile phone 1 is stood still from user's movement by walking or running, the mobile phone 1 may cause the communication module 6 to search for the base station 40. By limiting the conditions for causing the communication module 6 to search for the base station 40 to being still from the user's movement by walking or running, it is possible to exclude, for example, a case in which a vehicle temporarily stops when the user is moving by vehicle.

The case in which the mobile phone 1 checks the update in background communication has been explained; however, the contents of the background communication are not limited thereto. For example, the mobile phone 1 may check whether there is any newly arriving email or whether there is any notification, or the like in the background communication.

Figure 2:
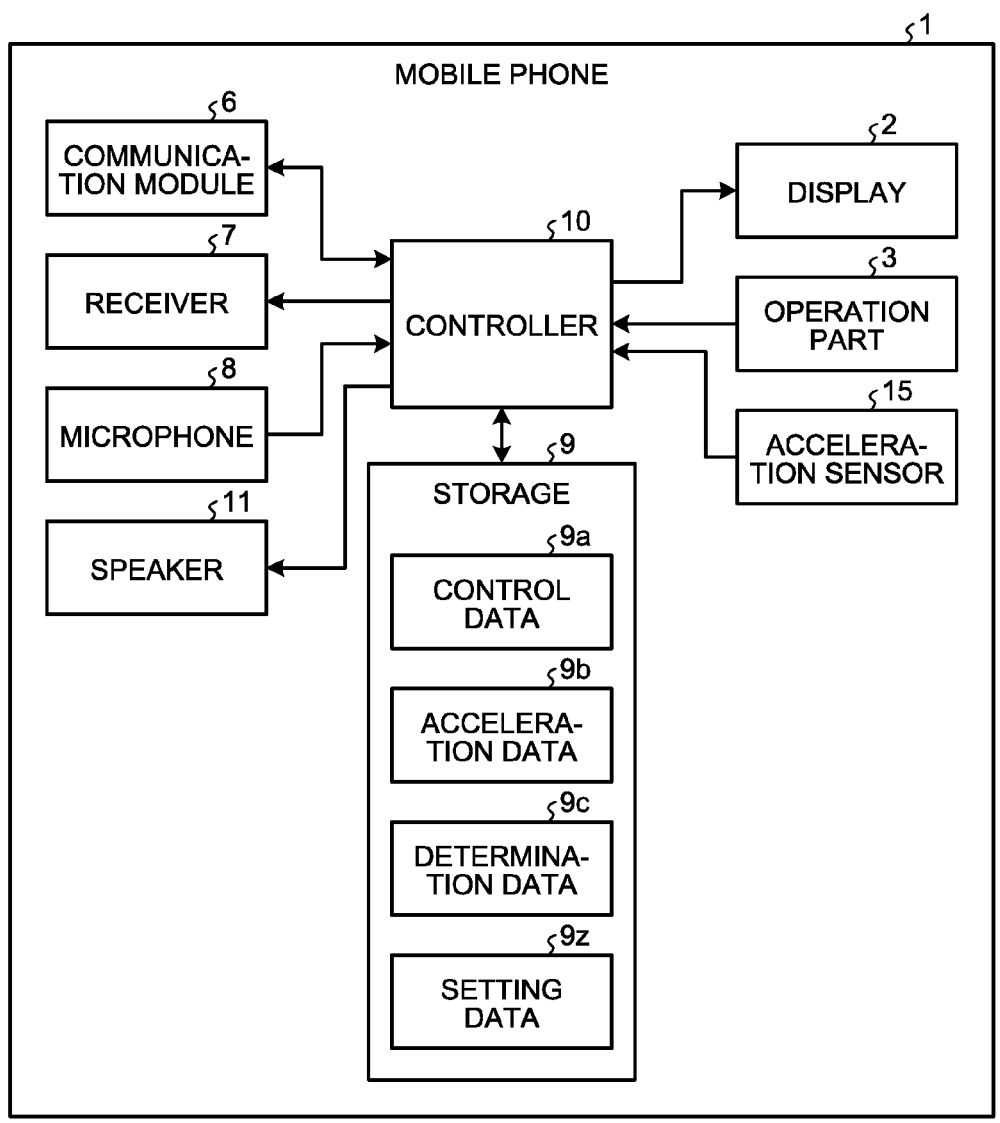
FIG. 2 is a block diagram of the mobile phone.

FIG. 2 is a block diagram of the mobile phone 1. The mobile phone 1 includes a display 2, an operation part 3, a communication module 6, a receiver 7, a microphone 8, a storage 9, a controller 10, a speaker 11, and an acceleration sensor 15.

The display 2 includes a display panel. The display panel includes a liquid crystal display, an organic electro-luminescence display, or the like. The display 2 can display information according to a signal input from the controller 10. The displayed information includes texts, graphics, and images etc. The displayed information includes a screen for notification, icons, and so on.

The operation part 3 includes a plurality of devices. The devices can accept a user operation. The devices include, for example, a key, a button, and a touch screen. The operation part 3 can input a signal according to the accepted operation to the controller 10.

The communication module 6 can perform wireless communication. The communication module 6 can support at least one of wireless communication standards. The wireless communication standard includes, for example, a cellular-phone communication standard such as 2G, 3G, and 4G. The cellular-phone communication standard includes, for example, LTE (Long Term Evolution), W-CDMA (Wideband Code Division Multiple Access), CDMA 2000 (Code Division Multiple Access 2000), PDC (Personal Digital Cellular), GSM (registered trademark) (Global System for Mobile Communications), and PHS (Personal Handy-phone System). The wireless communication standard further includes, for example, WiMAX (Worldwide Interoperability for Microwave Access), IEEE 802.11, Bluetooth (registered trademark), ZigBee, DECT (Digital Enhanced Cordless Telecommunications), Z-Wave, Wi-SUN (Wireless Smart Utility Network), IrDA (Infrared Data Association), and NFC (Near Field Communication). In the present embodiments, the communication module 6 will be explained based on the assumption that it performs short-range wireless communication through WiFi (registered trademark). The standard of the short-range wireless communication includes, for example, IEEE 802.11 (IEEE is short for The Institute of Electrical and Electronics Engineers, Inc.), Bluetooth (registered trademark), ZigBee, DECT, Z-Wave, and Wi-SUN.

The communication module 6 may receive a radio signal of a predetermined frequency band from a GPS satellite. The communication module 6 may demodulate the received radio signal. The communication module 6 may transmit the demodulated signal to the controller 10. The mobile phone 1 may include a discrete communication module independent from the communication module 6 by separating a communication function with the GPS satellite from the communication module 6.

The receiver 7 and the speaker 11 are one example of a sound output module. The receiver 7 and the speaker 11 can output a sound signal input from the controller 10 as sound. The receiver 7 may be used, for example, to output the other party's voice during a call. The speaker 11 may be used, for example, to output a ringtone and music. Either one of the receiver 7 and the speaker 11 may double as the other function. The microphone 8 is a sound input module. The microphone 8 can convert a user's voice or the like to a sound signal and input the converted sound signal to the controller 10.

The storage 9 can store data. The storage 9 is used also as a work area that temporarily stores a processing result of the controller 10. The storage 9 includes a storage medium. The storage medium may include any non-transitory storage medium such as a semiconductor storage medium and a magnetic storage medium. The storage 9 may include a plurality of types of storage mediums. The storage 9 may include a combination of a portable storage medium such as a memory card, an optical disk, or a magneto-optical disk with a reading device of the storage medium. The storage 9 may include a storage device used as a temporary storage area such as RAM (Random Access Memory).

The storage 9 stores, for example, a control data 9a, acceleration data 9b, determination data 9c, and setting data 9z. The control data 9a can provide a function related to various controls for operating the mobile phone 1. The acceleration data 9b includes information indicating acceleration acting on the mobile phone 1. The determination data 9c includes information used to determine the state of the mobile phone 1. The setting data 9z includes information related to various settings for the operations of the mobile phone 1.

The acceleration data 9b may include a plurality of pieces of acceleration information. The acceleration data 9b stores information in chronological order. The acceleration information includes items such as time and acceleration. The time indicates a time at which the acceleration sensor 15 detects an acceleration. The acceleration indicates a value of the acceleration detected by the acceleration sensor 15. The determination data 9c will be explained later.

The control data 9a can provide the function related to various controls for operating the mobile phone 1. The control data 9a may implement a call by controlling, for example, the communication module 6, the receiver 7, and the microphone 8. The function provided by the control data 9a includes the control of the acceleration sensor 15 and the like. The control data 9a includes a function of determining a state of the mobile phone 1 based on the acceleration and a function of searching for the base station 40 based on the state of the mobile phone 1. The state of the mobile phone 1 will be explained later. The function provided by the control data 9a may be used in combination with functions provided by other data.

The controller 10 includes a processor. Examples of the processor include, but are not limited to, a CPU (Central Processing Unit), an SoC (System-on-a-chip), an MCU (Micro Control Unit), and an FPGA (Field-Programmable Gate Array). Some other components such as the communication module 6 may be integrated into the SoC. The controller 10 can integrally control the operations of the mobile phone 1. Various functions are implemented based on the control by the controller 10.

Specifically, the controller 10 can execute instructions included in the data stored in the storage 9. The controller 10 can refer to the data stored in the storage 9 as needed. The controller 10 controls a function module according to data or instructions. The controller 10 controls the function module to thereby implement various functions. Examples of the function module include, but are not limited to, the display 2, the communication module 6, the receiver 7, and the speaker 11. The controller 10 can change the control according to the detection result of a detector. Examples of the detector include, but are not limited to, the operation part 3, the communication module 6, the microphone 8, and the acceleration sensor 15.

The acceleration sensor 15 can detect a direction and a magnitude of an acceleration acting on the mobile phone 1. The acceleration sensor 15 can output the detected result to the controller 10. For example, the acceleration sensor 15 may detect an acceleration in an X-axis direction, an acceleration in a Y-axis direction, and an acceleration in a Z-axis direction. The acceleration sensor 15 may transmit the detected three accelerations and a vector value obtained by combining the detected three accelerations, as the detection result of the acceleration sensor 15, to the controller 10.

The mobile phone 1 has a function of determining a plurality of states of the own device. The states of the mobile phone 1 include, for example, a stop state, a still state, a walking state, a running state, a moving state by vehicle, and a moving state by bicycle.

The stop state includes a state in which the user carrying the mobile phone 1 stops. The still state includes a state in which the mobile phone 1 is lying. The walking state includes a state in which the user carrying the mobile phone 1 is walking. The running state includes a state in which the user carrying the mobile phone 1 is running. The moving state by vehicle includes a state in which the user carrying the mobile phone 1 is moving by vehicle. The vehicle includes powered vehicles such as an automobile, a bike, a train, a bus, and an airplane except for a bicycle. The moving state by bicycle includes a state in which the user carrying the mobile phone 1 is moving by bicycle.

Figures 3, 4:
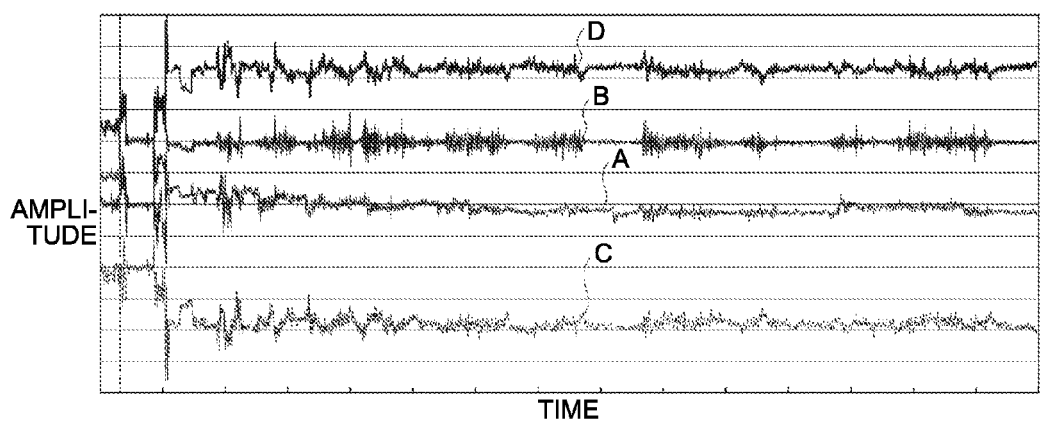
FIG. 3 is a diagram schematically illustrating detection results of an acceleration sensor.
FIG. 4 is a diagram illustrating a configuration example of determination data.

FIG. 3 is a diagram schematically illustrating detection results of the acceleration sensor 15. As illustrated in FIG. 3, the detection results of the acceleration sensor 15 may include an acceleration in the X-axis direction (A in FIG. 3), an acceleration in the Y-axis direction (B in FIG. 3), an acceleration in the Z-axis direction (C in FIG. 3), and a vector value (D in FIG. 3) obtained by combining those accelerations. The controller 10 receives the detection results of the acceleration sensor 15. The controller 10 may log the detection results in the acceleration data 9b of the storage 9.

The controller 10 can execute the control data 9a. The controller 10 analyzes the acceleration data 9b to determine the state of the mobile phone 1. For example, in determining the state of the mobile phone 1, the controller 10 may use data of acceleration patterns. The determination data 9c includes the acceleration patterns. The storage 9 may previously store, for example, the acceleration patterns as the determination data 9c of the storage 9.

FIG. 4 is a diagram illustrating a configuration example of the determination data 9c. The determination data 9c includes the acceleration patterns each corresponding to each of the states of the mobile phone 1. The acceleration pattern is previously extracted from those obtained by previously measuring which of the acceleration patterns is characteristically detected by the acceleration sensor 15 in each of the states of the mobile phone 1. The acceleration pattern is stored so as to be associated with the logged-in data of the combined vector value.

In the example of FIG. 4, the determination data 9c includes determination information corresponding to the states of the mobile phone 1. The determination information includes items such as an acceleration pattern and a state. The determination information of Pattern P0 includes an acceleration pattern corresponding to the stop state. The determination information of Pattern P1 includes an acceleration pattern corresponding to the still state. The determination information of Pattern P2 includes an acceleration pattern corresponding to the moving state by walking. The determination information of Pattern P3 includes an acceleration pattern corresponding to the moving state by running. The determination information of Pattern P4 includes an acceleration pattern corresponding to the moving state by each type of vehicles. The determination information of Pattern P5 includes an acceleration pattern corresponding to the moving state by bicycle.

For example, when the user holds the mobile phone 1 in his/her hand, there is a case in which a small amount of acceleration is detected by the acceleration sensor 15 even if the user thinks that the mobile phone 1 is stopped. Therefore, in the case of the stop state, the acceleration sensor 15 of the mobile phone 1 detects vibration etc. of the user carrying it. In the case of the still state in which no force is applied to a desk, a table, or the like on which the mobile phone 1 is lying, the acceleration sensor 15 detects noise whose change in amplitude or the like is smaller than that of the acceleration pattern of the stop state. Therefore, in the acceleration pattern P1 of the still state, changes in the amplitude, frequency, and the like of the acceleration become smaller than these of the acceleration pattern P0 of the stop state.

The controller 10 can compare the pattern of the combined vector with each acceleration pattern of the determination data 9c. The controller 10 can determine the state associated with the acceleration pattern matched in the comparison as the state of the mobile phone 1. In this comparison, the match includes a complete match and a partial match. That is, in this comparison, the match is not limited to the complete match.

For example, when the pattern of the combined vector matches any one of Pattern P0 to Pattern P5 of the determination data 9c, the controller 10 can determine that the mobile phone 1 is in any one of the states: the stop state, the still state, the moving state by walking, the moving state by running, and the moving state by bicycle. The controller 10 may determine a case in which the logged-in data of the combined vector value does not match any one of the moving states as the still state, instead of the acceleration pattern of the still state.

In the present embodiments, the case in which the mobile phone 1 determines the transition from the moving state by walking or running to the stop state or to the still state based on the acceleration patterns will be explained below; however, the embodiments are not limited thereto. For example, the mobile phone 1 may be configured to previously store a first threshold for determining the stop state and a second threshold for determining the still state, to compare an amplitude value of an acceleration with each of the thresholds, and to determine between the stop state and the still state. In this case, the first threshold is a value larger than the second threshold.

The mobile phone 1 has a function of automatically connecting or disconnecting the communication to or from the base station 40 by determining the state of the own device, based on the determined state. By executing the control data 9a, the mobile phone 1 can implement the function of automatically connecting or disconnecting the communication to or from the base station 40.

When determining any of the moving states by walking, running, vehicle, and bicycle, the mobile phone 1 controls the communication module 6 not to search for the base station 40. As a result, the mobile phone 1 does not search for the base station 40 during the moving state, thus reducing power consumption.

When the mobile phone 1 is in the moving state by walking or by running, a stop at a pass point through which the user arrives at a destination is, for example, waiting for a walk signal, traffic jam, or waiting for a train, and is more likely to start the movement again. In the moving state by walking or by running, the mobile phone 1 detects a stop based on the acceleration detected by the acceleration sensor 15, and determines, when the stop continues for a first period of time, the transition from the moving state to the stop state. The first period of time is a continuous time required for determining the transition to the stop state. In the present embodiments, a case in which the first period of time is, for example, five minutes will be explained below. When the transition from the moving state to the stop state is determined, the mobile phone 1 controls the communication module 6 to search for the base station 40.

When the mobile phone 1 is in the moving state by walking or by running, the stop when the user arrives at the destination is less likely to start the movement again. When the destination is the house or the office, the user is more likely to put the carried mobile phone 1 on a desk, a table, or the like. When the mobile phone 1 is lying on a desk, a table, or the like, the acceleration acting on the mobile phone 1 is less than that when it is carried by the user. The mobile phone 1 can determine whether it is in the stop state or the still state based on the difference between the acceleration patterns detected by the acceleration sensor 15.

When the acceleration corresponding to the still state continues for a second period of time, the mobile phone 1 determines the transition from the moving state by walking or by running to the still state, and controls the communication module 6 to search for the base station 40. The second period of time is a time required for determining that, for example, the acceleration is noise. The second period of time is shorter than the first period of time. The mobile phone 1 is more likely to determine the transition to the still state before the lapse of the first period of time for monitoring whether it is a temporary stop.

In this way, when determining the transition from the moving state by walking or running to the still state, the mobile phone 1 causes the communication module 6 to search for the base station 40 before the lapse of the first period of time. When transitioning from the moving state to the still state, the mobile phone 1 can cause the communication module 6 to search for the base station 40 at a timing earlier than the case of the transition from the moving state to the stop state. Because the mobile phone 1 does not transition to the stop state until the first period of time elapses, it is possible to reduce the possibility of searching for the base station 40 during user's temporary stop.

When the base station 40 is found, the mobile phone 1 tries performing a communication connection with the base station 40. When the found base station 40 is the base station 40 registered in the storage 9, the mobile phone 1 may be controlled so as to automatically establish the communication connection. When the found base station 40 is the one to which the connection has been established in the past, the mobile phone 1 may be controlled so as to automatically establish the communication connection. In this case, the information on the base station 40 to which the connection has been established in the past is stored in the storage 9.

The storage 9 stores information for identifying the base station 40. The information for identifying the base station 40 is, for example, SSID (Service Set Identifier). The storage 9 may store an access key used to establish the communication connection with the stored base station 40.

The mobile phone 1 repeats the search for the base station 40 until the communication connection is established; however, the embodiments are not limited thereto. For example, when the base station 40 is not found for a predetermined time (e.g., one minute), the mobile phone 1 may be configured to cancel the search for the base station 40. The control method of controlling the communication module 6 to cancel the search for the base station 40 includes a method of controlling so as not to execute a search function and a method of turning off the power of the communication module 6.

For example, in the case of the still state, the user is more likely not to use the mobile phone 1. When the communication connection between the communication module 6 and the base station 40 is established in the still state in which the background communication, not used by the user, is more easily performed, the mobile phone 1 starts the background communication through the communication by the base station 40. Starting the background communication includes, for example, executing a function for checking update and executing an application data for performing the background communication.

In this way, the mobile phone 1 can promptly perform data communication without any user operation at a timing when the user does not use it. As a result, the mobile phone 1 can reduce occurrence of the background communication when the user is using it.

For example, the mobile phone 1 in the still state is again carried by the user when he/she is to move or when he/she uses it, or the like. In this case, the state of the mobile phone 1 is the transition from the still state to the stop state or to the moving state. In the case of the still state, the mobile phone 1 determines whether the still state is transitioned to the stop state or to the moving state. When determining the transition from the still state to the stop state during the background communication, the mobile phone 1 stops the background communication. As a result, the mobile phone 1 is more likely to avoid the state in which the mobile phone 1 is during the background communication whenever the user wants to use it, thus improving convenience for the user.

Figure 5:
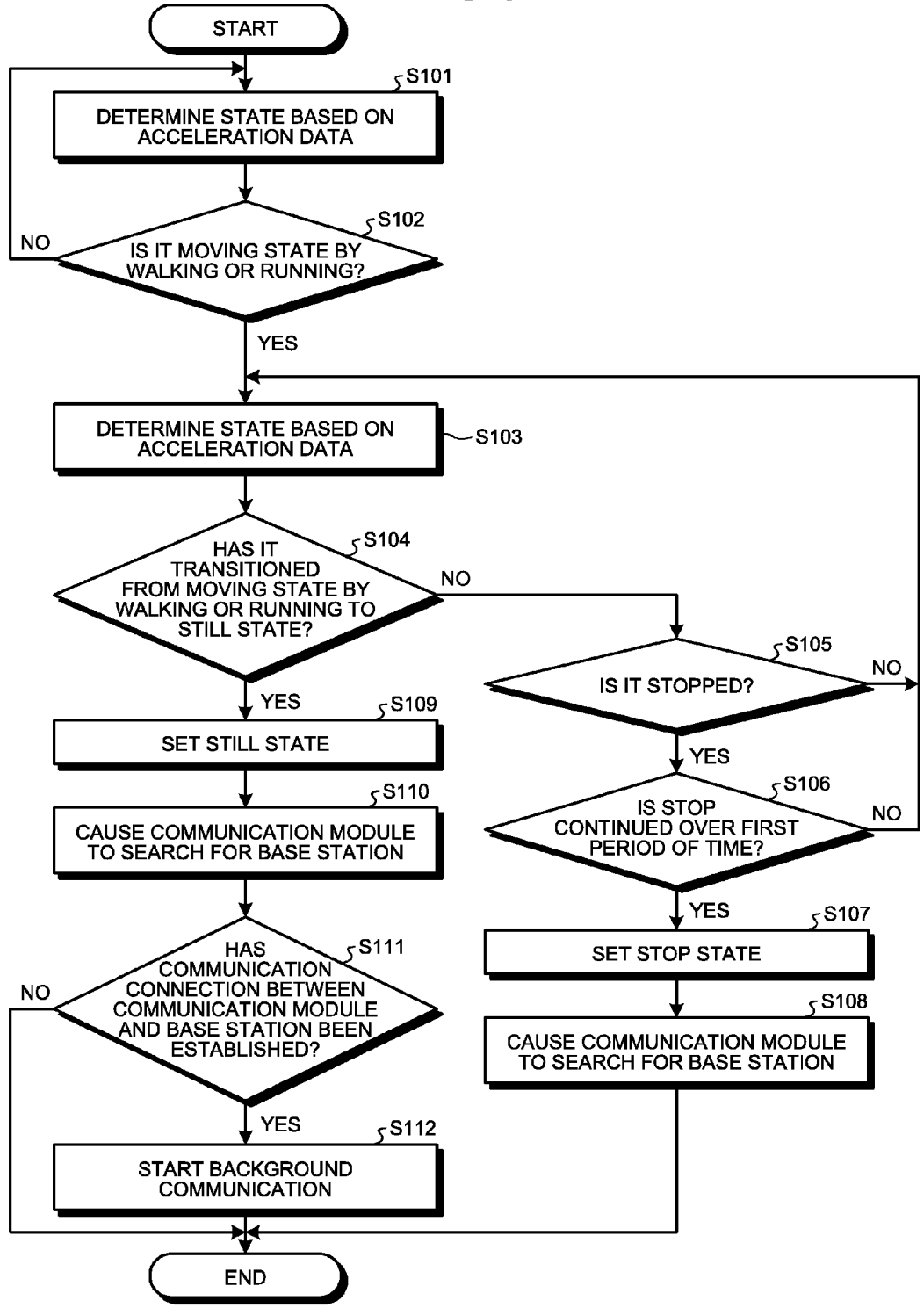
FIG. 5 is a flowchart illustrating a procedure of an example of state determination performed by the mobile phone.

A procedure for determining the state by the mobile phone 1 will be explained below with reference to FIG. 5. FIG. 5 is a flowchart illustrating a procedure of an example of state determination performed by the mobile phone 1. The procedure illustrated in FIG. 5 is implemented by the controller 10 executing the control data 9a. The procedure illustrated in FIG. 5 will be explained as a procedure of determining the state in real time. The mobile phone 1 is not limited to the embodiments, but may be configured to determine the state at predetermined time intervals.

As illustrated in FIG. 5, at Step S101, the controller 10 of the mobile phone 1 determines the state of the mobile phone 1 based on the acceleration data 9b. Specifically, the controller 10 compares the acceleration pattern of the acceleration data 9b with the acceleration pattern of the determination data 9c, and determines the state corresponding to the matched acceleration pattern of the determination data 9c as a state of the mobile phone 1.

When the state determined at Step S101 is not the moving state by walking or running (No at Step S102), the controller 10 returns to Step S101. When the state determined at Step S101 is the moving state by walking or running (Yes at Step S102), the controller 10 proceeds to Step S103. At Step S103, the controller 10 determines the state of the mobile phone 1 based on the acceleration data 9b. At Step S103, when the acceleration pattern of the acceleration data 9b is similar to the acceleration pattern of the stop state and the first period of time has not elapsed, the controller 10 determines that the mobile phone 1 stops.

When the state determined at Step S103 has not transitioned from the moving state by walking or running to the still state (No at Step S104), the controller 10 proceeds to Step S105. When the stop state is not determined at Step S103, that is, when the state is the moving state by walking or running (No at Step S105), the controller 10 returns to Step S103.

When the stop state is determined at Step S103, that is, when it is during determination whether the stop state is a temporary stop (Yes at Step S105), the controller 10 proceeds to Step S106. At Step S106, the controller 10 determines whether the stop continues over the first period of time based on the acceleration data 9b. When the stop does not continue over the first period of time (No at Step S106), the controller 10 returns to Step S103.

When the stop continues over the first period of time (Yes at Step S106), the controller 10 proceeds to Step S107. At Step S107, the controller 10 sets the stop state in the storage 9. At Step S108, the controller 10 causes the communication module 6 to search for the base station 40. For example, when the state of the communication module 6 is OFF, the controller 10 changes the state of the communication module 6 to be ON and causes it to search for the base station 40. The case in which the state of the communication module 6 is OFF includes, for example, a case in which a short-range wireless function is OFF and a case in which the power of the communication module 6 is OFF. Thereafter, the controller 10 ends the procedure illustrated in FIG. 5.

When the state determined at Step S103 has transitioned from the moving state by walking or running to the still state (Yes at Step S104), the controller 10 proceeds to Step S109. At Step S109, the controller 10 sets the still state in the storage 9. At Step S110, the controller 10 causes the communication module 6 to search for the base station 40.

When the communication connection between the communication module 6 and the base station 40 has not been established (No at Step S111), the controller 10 ends the procedure illustrated in FIG. 5. When the communication connection between the communication module 6 and the base station 40 has not been established, the controller 10 may causes the communication module 6 to search for the base station 40 by a predetermined number.

When the communication connection between the communication module 6 and the base station 40 has been established (Yes at Step S111), the controller 10 proceeds to Step S112. At Step S112, the controller 10 starts the background communication. Thereafter, the controller 10 ends the procedure illustrated in FIG. 5.

Figure 6:
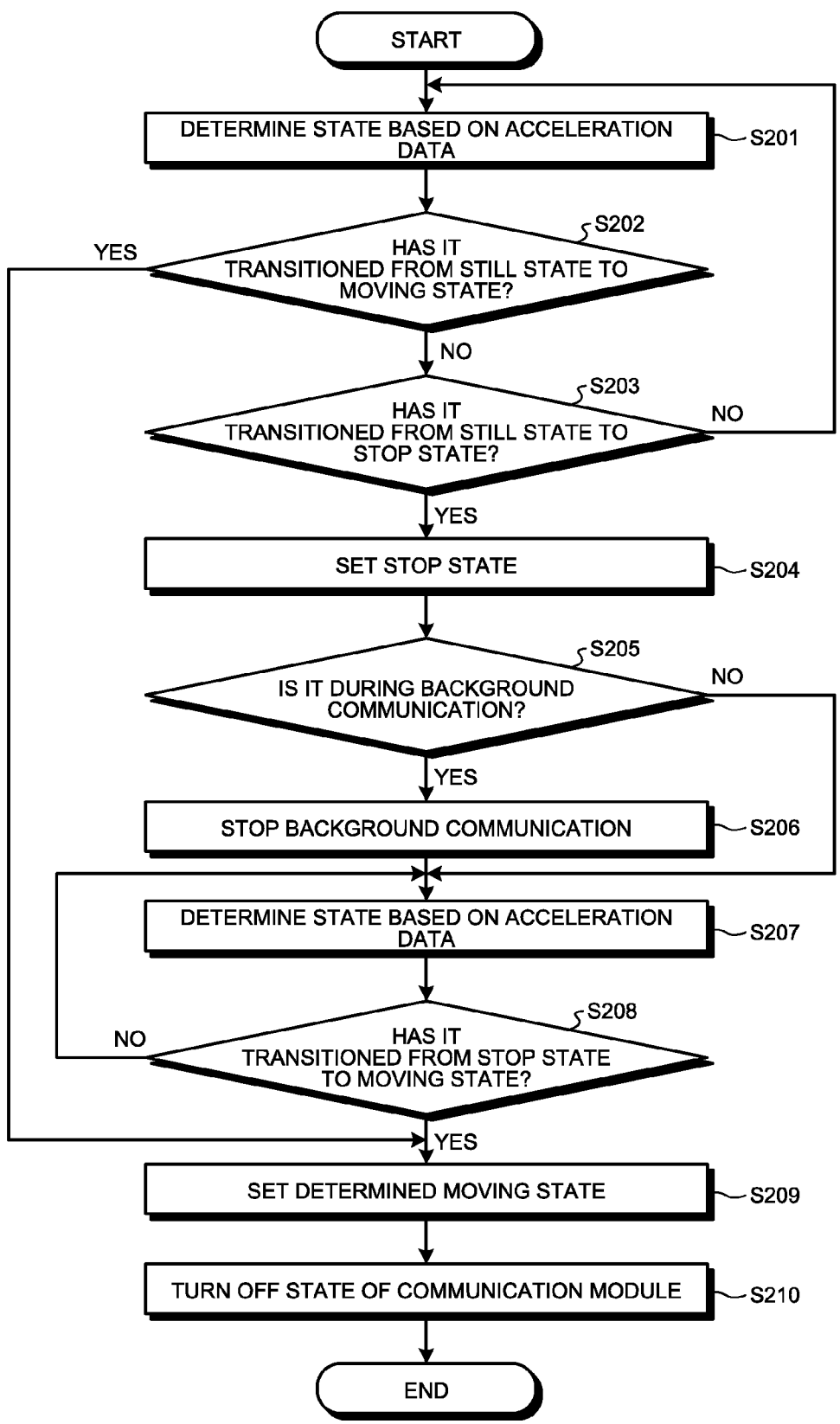
FIG. 6 is a flowchart illustrating a procedure of another example of the state determination performed by the mobile phone.

A procedure according to the mobile phone 1 in the still state will be explained below with reference to FIG. 6. FIG. 6 is a flowchart illustrating the procedure of another example of the state determination performed by the mobile phone 1. The procedure illustrated in FIG. 6 is implemented by the controller 10 executing the control data 9a in the still state. The procedure illustrated in FIG. 6 will be explained as a procedure of determining the state in real time. The mobile phone 1 is not limited to the embodiments, but may be configured to determine the state at predetermined time intervals.

As illustrated in FIG. 6, at Step S201, the controller 10 of the mobile phone 1 determines the state of the mobile phone 1 based on the acceleration data 9b. Specifically, the controller 10 determines whether the state has transitioned from the still state to the stop state or to the moving state by any one of walking, running, vehicle, and bicycle. When the state determined at Step S201 has transitioned from the still state to the moving state (Yes at Step S202), the controller 10 proceeds to Step S209. The explanation of Step S209 will be explained later.

When the state determined at Step S201 has not transitioned from the still state to the moving state (No at Step S202), the controller 10 proceeds to Step S203. When the state determined at Step S201 has not transitioned from the still state to the stop state (No at Step S203), the controller 10 returns to Step S201. When the state determined at Step S201 has transitioned from the still state to the stop state (Yes at Step S203), the controller 10 proceeds to Step S204.

At Step S204, the controller 10 sets the stop state in the storage 9. At Step S205, the controller 10 determines whether it is during background communication. When it is not during background communication (No at Step S205), the controller 10 proceeds to Step S207. The procedure of Step S207 will be explained later.

When it is during background communication (Yes at Step S205), the controller 10 proceeds to Step S206. At Step S206, the controller 10 stops the background communication. The case in which the background communication is stopped includes, for example, a case in which the execution of the function for checking update is ended and a case in which the execution of the application data for performing the background communication is ended.

At Step S207, the controller 10 determines the state of the mobile phone 1 based on the acceleration data 9b. Specifically, the controller 10 determines whether the state has transitioned from the stop state to the moving state by any one of walking, running, vehicle, and bicycle. When the state determined at Step S207 has not transitioned from the stop state to the moving state (No at Step S208), the controller 10 returns to Step S207.

When the state determined at Step S207 has transitioned from the stop state to the moving state (Yes at Step S208), the controller 10 proceeds to Step S209. At Step S209, the controller 10 sets the moving state determined at Step S201 or Step S207 in the storage 9. At Step S210, the controller 10 turns off the state of the communication module 6. Thereafter, the controller 10 ends the procedure illustrated in FIG. 6.

In the procedure illustrated in FIG. 6, the case in which when it is determined that the state has transitioned from the still state to the moving state, the controller 10 turns off the state of the communication module 6 has been explained; however, the embodiments are not limited thereto. For example, when it is determined that the state has transitioned from the still state to the moving state, the controller 10 may hold or cancel the background communication if during the background communication to turn off the state of the communication module 6.

In the procedure illustrated in FIG. 6, the transition from the still state to the moving state is determined; however, the embodiments are not limited thereto. For example, there is a case in which the mobile phone 1 in the still state is temporarily held in hand and used by the user and then the mobile phone 1 is again in the still state. Therefore, the controller 10 may be configured to determine the transition from the stop state to the still state after the transition from the still state to the stop state. When the state has transitioned from the stop state to the still state, the controller 10 may restart the background communication stopped at the time of transition to the stop state.

The embodiments disclosed in the present application can be modified within a scope that does not depart from the gist and the scope of the invention. Moreover, the embodiments and modifications thereof disclosed in the present application can be combined with each other if necessary. For example, the embodiments may be modified as follows.

For example, the control data illustrated in FIG. 2 may be divided into a plurality of modules, or may be combined with any other data.

In the embodiments, the mobile phone 1 may be configured so that the user can set as to whether to search for, for example, the access point corresponding to the base station 40 and a public line LAN when the state transitions to each of the states.

In other words, the setting data 9z of the storage 9 may include setting information as to whether to search for, for example, the base station 40 in each of the states. The controller 10 may be configured to display a setting screen 70 illustrated in FIG. 7 on the display 2 and accept settings as to whether to search for the base station 40 or the like in each of the states.

Figure 7:
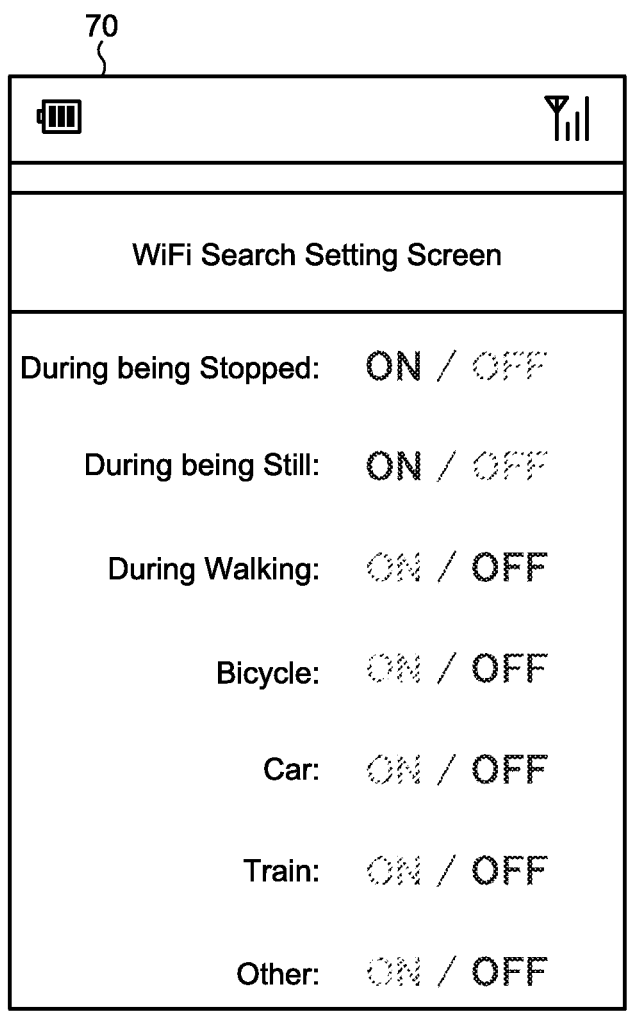
FIG. 7 is a diagram illustrating a screen example for setting search permission of a base station in each state.

In the example of FIG. 7, the setting information indicates the settings of searching for the base station 40 or the like when the state transitions from the moving state to the stop state and from the moving state to the still state. In the case of the settings, the mobile phone 1 searches for the base station 40 when the state transitions from the moving state by walking or running to the stop state or to the still state as explained in the embodiments. For example, there is a case in which ON is set in either one of the stop state and the still state. In this case, the mobile phone 1 may be configured so as not to search for the base station 40 when the state transitions to the state in which OFF is set. Alternatively, the mobile phone 1 may be configured so as not to determine the transition from the still state to the state in which OFF is set.

In the embodiments, the mobile phone has been explained as an example of the mobile electronic device; however, the mobile electronic device according to the appended claims is not limited to the mobile phone. The mobile electronic device according to the appended claims may be a mobile electronic device other than the mobile phone. Examples of the mobile electronic devices include, but are not limited to, smartphones, mobile phones, tablets, mobile personal computers, digital cameras, smart watches, media players, electronic book readers, navigators, and gaming devices.

Although the art of appended claims has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

In the present application, the descriptions such as "when", "during", "if", "in a case", "upon", "in response to determining", and "in response to detecting" may be understood in place of other descriptions depending on situations.

In the present application, the descriptions such as "when 'a stated condition or event' is determined", "when 'a stated condition or event' is detected", or "upon determining 'a stated condition or event'", "in response to determining", "upon detecting", or "in response to detecting" may be understood in place of other descriptions depending on situations.

In the present application, the description such as "detect" may be understood as meaning of "measure", "scale", and "sense" depending on situations.

In the present application, the description such as "state" may be understood as "situation" depending on situations. For example, the moving state can be understood as "moving situation". The state of the mobile phone can be understood as "situation of the mobile phone".

The invention claimed is:

1. A mobile electronic device, comprising:
an acceleration sensor configured to detect an acceleration;
a communication circuitry configured to communicate with a base station; and
a controller configured to detect a moving state in which an own device is moving based on the acceleration, wherein
the controller is configured to
cause, when detecting that the own device in the moving state is stopped, the communication circuitry to search for the base station after a lapse of a first period of time,
cause, when detecting that the own device in the moving state is still, the communication circuitry to search for the base station before the lapse of the first period of time, and
when a communication connection with the base station searched in a still state of the own device is established, the controller is configured to start background communication.

2. The mobile electronic device according to claim 1, wherein the moving state indicates a state of moving by at least one of walking and running.

3. The mobile electronic device according to claim 1, wherein,
when the own device transitions from the still state to a stop state, the controller is configured to stop the background communication.

4. A mobile electronic device, comprising:
an acceleration sensor configured to detect a magnitude of an acceleration and a direction of the acceleration;
a communication circuitry configured to communicate with a base station; and
a controller configured to detect a situation where an own device is moving based on the magnitude and the direction of the acceleration, wherein
the controller is configured to
cause, when detecting that movement is stopped during the movement of the situation, the communication circuitry to search for the base station after a lapse of a first period of time, and
cause, when detecting that the own device is stood still from the movement of the situation, the communication circuitry to search for the base station before the lapse of the first period of time.

5. A control method for a mobile electronic device including an acceleration sensor and a communication circuitry configured to communicate with a base station, the control method comprising the steps of:
detecting a moving state of an own device based on an acceleration detected by the acceleration sensor;
causing, when detecting that the own device in the moving state is stopped, the communication circuitry to search for the base station after a lapse of a first period of time;
causing, when detecting that the own device in the moving state is still, the communication circuitry to search for the base station before the lapse of the first period of time; and
causing, when a communication connection with the base station searched in a still state of the own device is established, the controller to start a background communication.

* * * * *